United States Patent [19]

Dost et al.

[11] Patent Number: 4,638,486
[45] Date of Patent: Jan. 20, 1987

[54] ADJUSTMENT DEVICE FOR A REFLECTOR MIRROR OF A LASER RESONATOR

[75] Inventors: Willibald Dost; Hans Kreutzer, both of Munich, Fed. Rep. of Germany

[73] Assignee: Siemens Aktiengesellschaft, Berlin and Munich, Fed. Rep. of Germany

[21] Appl. No.: 717,106

[22] Filed: Mar. 28, 1985

[30] Foreign Application Priority Data

Jun. 25, 1984 [DE] Fed. Rep. of Germany ....... 3423381

[51] Int. Cl.$^4$ .............................................. H01S 3/08
[52] U.S. Cl. ...................................... 372/107; 372/34; 372/108; 350/633; 350/634
[58] Field of Search ...................... 372/99, 107, 61, 98, 372/34, 108; 350/633, 634

[56] References Cited

U.S. PATENT DOCUMENTS

| | | | |
|---|---|---|---|
| 3,478,608 | 11/1969 | Met | 372/107 |
| 3,783,407 | 1/1974 | Mefferd et al. | 372/107 |
| 4,216,438 | 8/1980 | Seki et al. | 372/107 |
| 4,217,559 | 8/1980 | Van den Brunk et al. | 372/107 |
| 4,442,524 | 4/1984 | Reeder et al. | 372/107 |

FOREIGN PATENT DOCUMENTS 3130420 3/1983 Fed. Rep. of Germany ...... 372/107

*Primary Examiner*—Leon Scott, Jr.
*Attorney, Agent, or Firm*—Hill, Van Santen, Steadman & Simpson

[57] ABSTRACT

An adjustment device for adjusting the reflector mirrors of a laser resonator to be precisely parallel to one another comprises a carrier and an integral adjustment head together having an H-cross section provided by a recess system of a peripheral outer recess flanked by a pair of inner circular recesses so that an axially elastic and adequately side stable and temperature permanent adjustment derives.

5 Claims, 2 Drawing Figures

ADJUSTMENT DEVICE FOR A REFLECTOR MIRROR OF A LASER RESONATOR

BACKGROUND OF THE INVENTION

1. Field of the Invention

The present invention relates to an adjustment device for a reflector mirror of a laser resonator in which the reflector mirror is mounted in an adjustment head fashioned of one piece with a carrier, whereby the carrier and the adjustment head are designed with an aligning daylight passage, an outer recess which is radially directed and extends completely around is provided between the carrier and the adjustment head, and the adjustment head is tiltable relative to the carrier by way of adjustment screws disposed at the adjustment head at the corners of a triangle and acting against the end face of the carrier.

2. Description of the Prior Art

In lasers, the optical reversing elements of the resonator must be able to be adjusted as precisely parallel to one another as possible with simple structure. The adjustment, once set, should thereby be optimally stable with respect to temperature. Various adjustment devices have been disclosed for adjusting reflector mirrors in laser resonators. Metal bellows which are soldered or welded are thereby frequently employed. These, however, can cause tightness problems. Moreover, stability problems can arise due to the relatively great softness and relatively low side stability of such bellows.

The German published application No. 31 30 420, fully incorporated herein by this reference, discloses an adjustment device of the type set forth above wherein the adjustment head and the carrier are composed of one piece and a radially directed, peripheral outer recess is provided between the carrier and the adjustment head. The adjustment of one reflector mirror parallel to the other reflector mirror thereby occurs by way of adjustment screws provided in the adjustment head which act against the end face of the carrier and with the assistance of the adjustment head is tiltable relative to the carrier as a consequence of the radial, outer recess. Such adjustment devices have a simple, stable structure. Great stability of an adjustment device provided with an outer radial recess, however, can result in excessive stresses arising in the recess region during adjustment. Given a change in temperature, these stresses can lead to a change in the original adjustment setting.

SUMMARY OF THE INVENTION

The object of the present invention is to provide an adjustment device of the type generally set forth above such that the device has an adequate axial elasticity and a high temperature permanence despite the required stability.

Given an adjustment device of the type mentioned above, the above object is achieved, according to the present invention, in that both the carrier and the adjustment head are designed with a respective, inner, radially directed circular recess in the region of their end faces proximate to the outer recess, and in that the inner recesses are respectively separated from the outer recess lying therebetween by a thin, discoid wall.

With the adjustment device constructed in accordance with the present invention, two inner, radial recesses are also provided in addition to the outer, radial recess, so that the carrier and adjustment head of the adjustment device are fashioned with a recess system disposed with an H-shaped cross section. The walls separating the inner recesses from the outer recess thus act like two discoid springs whose spring characteristic is like that of Belleville spring washers. In this manner, the advantage of the bellows, namely the axial elasticity, is achieved with the adjustment device constructed in accordance with the invention and is combined with the advantage over a bellows of having greater side stability. Moreover, the three adjustment screws in the adjustment device according to the present invention lend the discoid springs an axial prestressing. This causes the adjustment head to be drawn against the carrier and, therefore, a disadjustment given temperature changes or a chatter given jarring stresses are prevented. The adjustment device constructed in accordance with the invention therefore also has a high temperature permanence. Finally, the advantage of absolute tightness derives over adjustment devices having bellows, since the adjustment head is a fixed component of the carrier and additional joining techniques are therefore not required.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
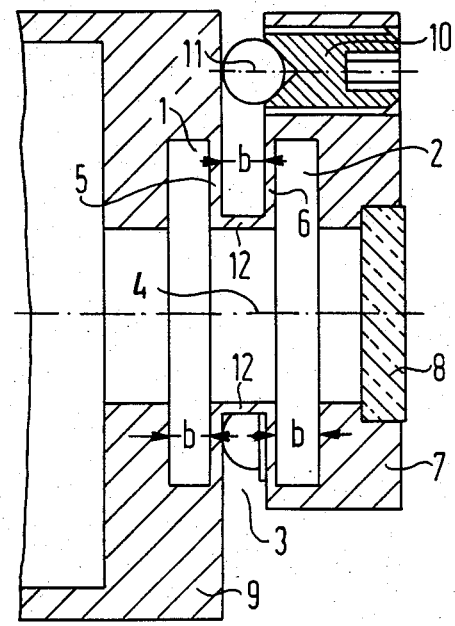
FIG. 1 is a sectional view of one end of a laser, taken substantially along the line I—I of FIG. 2, illustrating the adjustment structure of the present invention.
Figure 2:
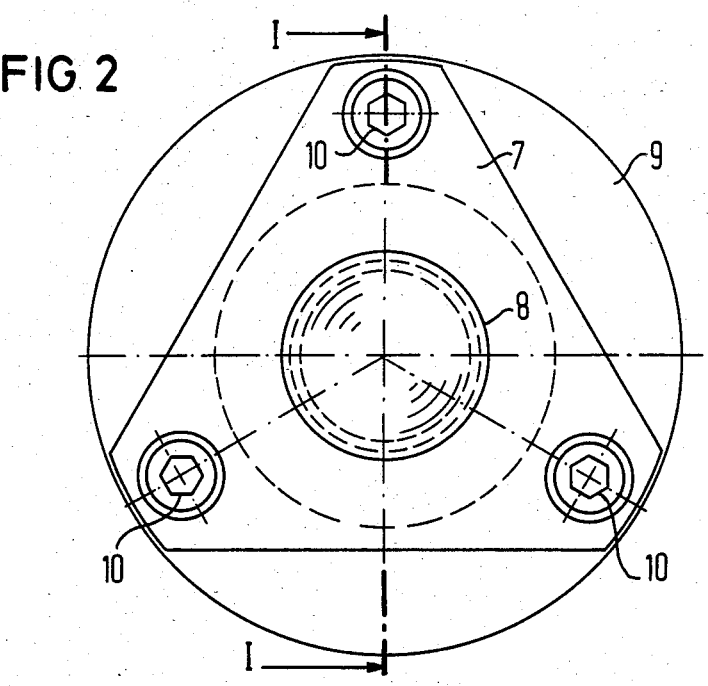
FIG. 2 is an end view of the adjustment device illustrated in FIG. 1.

Referring to the drawing, the adjustment device for a reflector mirror to be adjusted parallel to the second reflector mirror (not shown) of a laser resonator, for example, an out-coupling window 8, is composed of a carrier 9 which can be arbitrary in shape, for example a discoid housing part or a tubular resonator carrier of the laser, and of an adjustment head 7 of one piece, that is integral, with the carrier 9 and provided at the end face thereof, the adjustment head 7 being designed here as an approximately triangular plate having rounded corners. The reflector mirror 8 is mounted in the adjustment head 7 and is held in a known manner not shown in detail here. The carrier and the adjustment head are fashioned with an aligning daylight passage 4 for the laser beam. A radially directed, peripheral recess 3 is provided between the free end face of the carrier 9 and the adjustment head 7, so that the longitudinal axis of the adjustment head is tiltable relative to the carrier or, respectively, the longitudinal axis of the carrier by way of adjustment screws 10 and the appertaining balls 11, the adjustment screws 10 being designed in a manner known per se (the German published application No. 31 30 420), and being disposed at the corners of the triangular adjustment head 7 and acting against the end face of the carrier. Both the carrier 9 and the adjustment head 7, i.e. their daylight passage 4, are fashioned with a respective inner, radially directed circular recess 1, 2, i.e. an inner recess which circularly surrounds the longitudinal axis of the carrier and, respectively, adjustment head, the inner recesses being provided in the region of their end faces proximate to the outer recess 3, whereby the inner recesses are respectively separated from the outer recess 3 interposed therebetween by way of a discoid wall 5, 6, respectively. As a result of the two inner recesses 1 and 2, the outer recess 3 and the daylight passage 4, these walls therefore form two discoid, mutually interconnected springs 5 and 6 which behave like Belleville spring washers with respect to their spring characteristic, whereby the spring 6 is directed connected to the adjustment head or, respectively, is a component part thereof. The outer recess 3 extends up to the daylight passage 4 except for a wall thickness 12 corresponding to the thickness of the springs 5, 6. A recess system having an H-shaped disposition derives in this manner. The width b of the recesses 1, 2 and 3 is thereby the same, whereby the inner recesses 1, 2 have the same diameter which is approximately equal to twice the diameter of the passage 4.

The adjustment of the adjustment head 7 occurs by way of the aforementioned three screws 10 which press against the carrier 9 by way of the balls 11 and thereby lend the discoid springs 5 and 6 an axial prestressing. The adjustment head 7 is thereby drawn against the carrier 9. By way of a corresponding adjustment of the screws 10, the reflector mirror 8 located in the adjustment head 7 can be adjusted into any desired position and can be adjusted parallel to the other mirror (not shown) of the laser resonator with a high precision.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a laser resonator of the type which includes a reflector mirror mounted in an adjustment head carrier and spaced from the carrier by an outer peripheral recess therebetween and in which the carrier and the adjustment head comprise a light passageway therethrough having an axis, and in which adjustment elements are carried by the adjustment head and engage the carrier, the improvement therein comprising:

first means defining a first radially extending circular recess about the light passage in the carrier and a first thin discoid wall separating said first recess from the outer peripheral recess; and second means defining a second circular recess about the light passageway in the adjustment head and a second thin discoid wall separating said second recess from the outer peripheral recess.

2. The improved laser resonator of claim 1, and further comprising:

a third wall separating the outer peripheral recess from the light passageway, said first and second thin discoid walls and said third wall having the same thickness.

3. The improved laser resonator of claim 1, wherein:
all of said recesses comprise the same width in the axial direction.

4. The improved laser resonator of claim 1, wherein:
said first and second circular recesses comprise the same diameter.

5. The improved laser resonator of claim 4, wherein:
said diameter of said first and second recesses is approximately equal to twice the diameter of the light passageway.

* * * * *